(12) United States Patent
Grabiec et al.

(10) Patent No.: US 10,458,496 B2
(45) Date of Patent: Oct. 29, 2019

(54) PROTECTIVE COVER FOR VEHICLE BRAKE

(71) Applicant: Ford Global Technologies, LLC, Dearborn, MI (US)

(72) Inventors: Tomasz Pawel Grabiec, Bergisch Gladbach (DE); Eugen Weber, Cologne (DE); Marc Oliver Rettig, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/876,753

(22) Filed: Jan. 22, 2018

(65) Prior Publication Data

US 2018/0209499 A1 Jul. 26, 2018

(30) Foreign Application Priority Data

Jan. 23, 2017 (DE) ........................ 10 2017 201 018

(51) Int. Cl.
| | |
|---|---|
| *F16D 65/12* | (2006.01) |
| *F16D 65/847* | (2006.01) |
| *B60B 19/10* | (2006.01) |
| *F16D 55/00* | (2006.01) |
| *F16D 65/02* | (2006.01) |

(52) U.S. Cl.
CPC ......... *F16D 65/128* (2013.01); *F16D 65/847* (2013.01); *F16D 2055/0037* (2013.01); *F16D 2065/1384* (2013.01)

(58) Field of Classification Search
CPC ....... B60B 7/00; B60B 7/0053; B60B 7/0066; B60B 7/0086; F16D 65/0081
USPC .... 188/264 A, 264 AA, 264 R; 301/6.3, 6.4, 301/37.101–37.108
See application file for complete search history.

(56) References Cited

U.S. PATENT DOCUMENTS

| | | | | |
|---|---|---|---|---|
| 3,168,348 | A * | 2/1965 | Fleming | ................ B60B 7/0086 301/13.1 |
| 4,593,953 | A * | 6/1986 | Baba | ........................ B60B 7/00 301/37.101 |
| 7,594,567 | B2 | 9/2009 | Sabelstrom | |
| 7,661,766 | B2 * | 2/2010 | Davis | .................... B60B 7/0066 301/37.108 |

(Continued)

FOREIGN PATENT DOCUMENTS

| | | |
|---|---|---|
| DE | 3816415 A1 | 11/1989 |
| DE | 4243988 A1 | 6/1994 |

*Primary Examiner* — Christopher P Schwartz
(74) *Attorney, Agent, or Firm* — Raymond L. Coppiellie; Burgess Law Office, PLLC

(57) ABSTRACT

A braking apparatus for a vehicle including a wheel suspension part attached to a body of the vehicle and a wheel hub attached to the wheel suspension part. An attached air-cooled brake disk rotates relative to the wheel suspension part. A protective cover arranged on a side of the brake disk that at least partially covers the brake disk. The protective cover fastened in a stationary manner to the wheel suspension part. The protective cover including an air flow opening feeding cooling air to the brake disk. An airflow control mechanism opens and closes the air flow opening along with reducing and increasing a gap between a radial end side of the brake disk and an inner side of a wheel rim of a vehicle wheel.

18 Claims, 4 Drawing Sheets

(56) References Cited

U.S. PATENT DOCUMENTS

| | | | | |
|---|---|---|---|---|
| 8,857,921 B2* | 10/2014 | Schmid | ............ | B60B 3/10 |
| | | | | 301/37.107 |
| 9,233,575 B2* | 1/2016 | Haase | ............ | B60B 7/00 |
| 9,422,993 B2* | 8/2016 | Watarai | ............ | F16D 65/12 |
| 9,915,306 B2* | 3/2018 | Koshiyama | ............ | F16D 65/0081 |
| 9,919,555 B2* | 3/2018 | Wippler | ............ | B60B 3/007 |
| 2008/0257666 A1* | 10/2008 | Gelb | ............ | F16D 55/00 |
| | | | | 188/264 R |
| 2009/0195053 A1* | 8/2009 | Kruse | ............ | B60B 7/0053 |
| | | | | 301/6.4 |
| 2018/0094684 A1* | 4/2018 | Kobayashi | ............ | F16D 65/0081 |

* cited by examiner

PROTECTIVE COVER FOR VEHICLE BRAKE

CROSS-REFERENCE TO RELATED APPLICATIONS

Not Applicable.

BACKGROUND OF THE INVENTION

1. Field of the Invention

The present invention relates to a braking apparatus for a vehicle, and more specifically, a vehicle having an air-cooled brake disk and a protective cover having an air flow opening feeding cooling air to the brake disk.

2. Description of Related Art

Vehicles such as passenger motor vehicles or trucks use disk brakes. Disk brakes generate thermal energy during braking dissipated by ventilating the brake disks. Typically, a brake disk includes radial flow ducts in the brake disk. Centrifugal force occurring because of rotational movement of the brake disk initiates air flow through the radial flow ducts, the air flows through openings in the brake disk. The openings situated in the vicinity of a wheel hub, to which the brake disk is attached. Brake disks of this type are also called internally ventilated brake disks.

Brake disks are components of a vehicle subjected directly to the environment, including weather conditions. In general, the brake disks are adjacent the vehicle wheels, in particular in the wheel rims thereof. To protect the brake disks, which rotate with the wheels, against contamination that may impair braking action, in particular against spray water, a disk-shaped protective cover covers at least the side of the brake disk on the vehicle inside over as much of the surface area as possible.

The protective cover on the side of the brake disk protecting against contamination and spray water may impair the ventilation of the brake disk. To provide cooling of the brake disk, the protective cover includes an air flow opening feeding in cooling air to the brake disk.

Cooling air is continually fed into the brake disk, in particular even when cooling of the brake disk is unnecessary because of low loading. Also, the air flow opening in the protective cover may reduce the actual function of the protective cover, namely to protect the brake disk against spray water and contamination.

SUMMARY OF THE INVENTION

A braking apparatus for a vehicle including a wheel suspension attached to the vehicle and a wheel hub attached to the wheel suspension. A brake disk is rotatably attached to the wheel suspension part with a protective cover partially covering the brake disk. The protective cover fastened to the wheel suspension. The protective cover having an air flow opening feeding cooling air to the brake disk and an airflow control mechanism operative to open and close, or restrict, the air flow opening. The airflow control mechanism also operative to reduce and increase a gap between a radial end or side of the brake disk and an inner side of a wheel rim of a vehicle wheel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In the different figures, parts which are equivalent with regard to their function are always provided with the same designations, with the result that said parts are as a rule also described only once.

Figure 1:
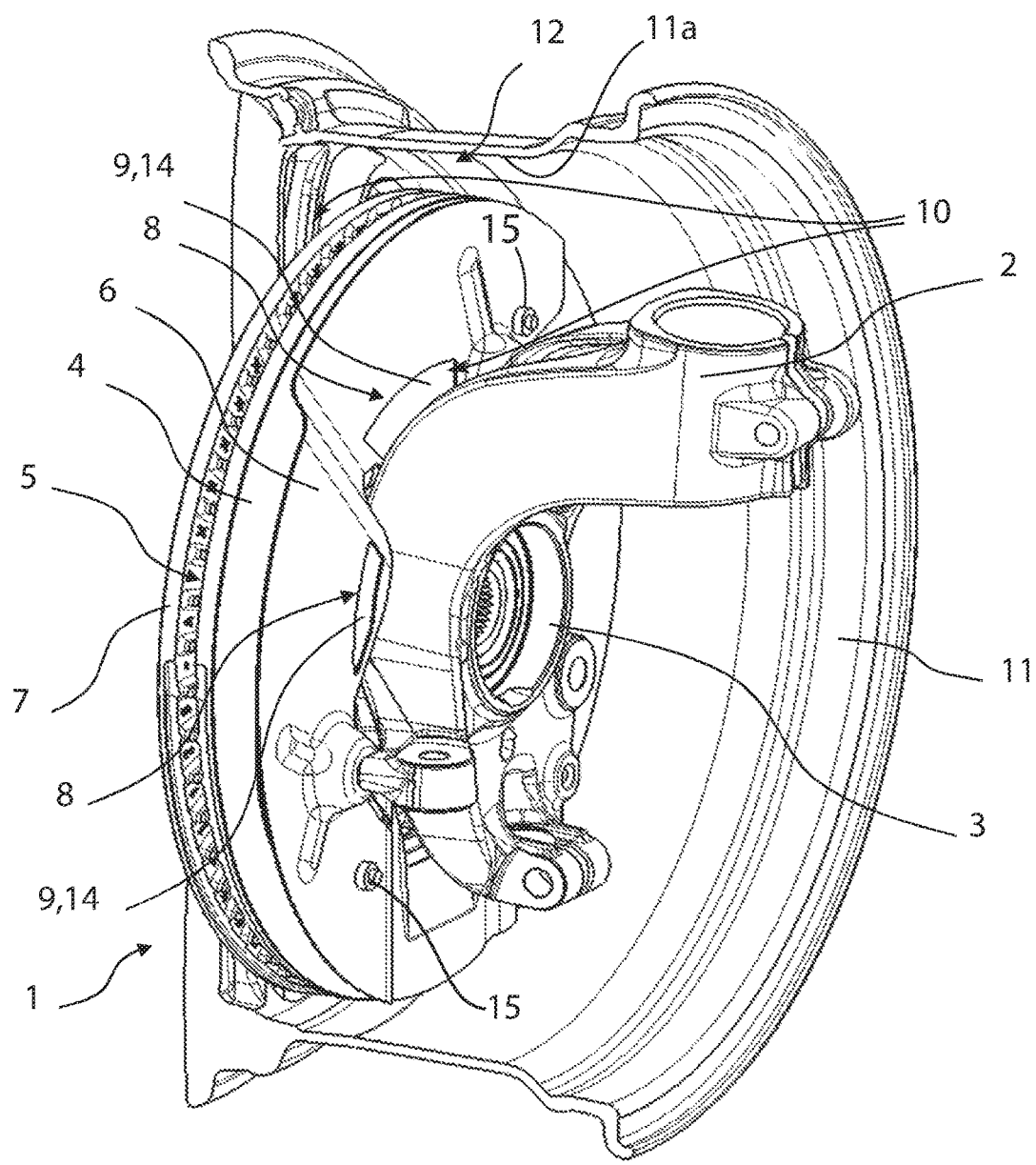
FIG. 1 is a perspective view of an exemplary embodiment of a braking apparatus in a first operating position.

FIG. 1 is a perspective view of an exemplary embodiment of a braking apparatus 1 for a vehicle, in particular, a motor vehicle, in a first operating position. FIG. 1 shows the braking apparatus 1 as viewed from the vehicle side, on the vehicle inside.

As shown in FIG. 1, the braking apparatus 1 includes a wheel suspension part 2 in the form of a wheel support, typically attached to a body (not shown) of the vehicle. A wheel hub 3 is attached to the wheel suspension part or wheel support 2. An air-cooled brake disk 4 is attached to the wheel hub 3 and rotates relative to the wheel suspension part or wheel support 2. The brake disk 4, shown in FIG. 1 is an internally ventilated brake disk which, in a known manner, includes radial flow ducts 5 for ventilation. The radial flow ducts 5 can be, for example, rectilinear or curved in terms of their radial course. Air flow through the flow ducts 5 is initiated by rotational movement of the brake disk 4 during vehicle operation due to a centrifugal force. The air flow flows through inlet openings in the brake disk 4 situated in the vicinity of the wheel hub 3.

FIG. 1 also shows a disk-shaped protective cover 6 in the form of a metal protective plate covering the brake disk 4 of the brake apparatus 1. The protective cover 6 substantially covers the full surface area the brake disk 4. The protective cover 6 extends from the hub 3 to a radial end side 7 of the brake disk 4, and therefore covers the inlet openings, not visible in FIG. 1, of the flow ducts 5 in the brake disk 4. As shown in FIG. 1, the protective cover 6 is on the vehicle side of the brake disk 4 and is fastened in a stationary manner to the wheel suspension part or wheel support 2. For example, the protective cover 6 connects directly to the wheel suspension part or wheel support 2.

FIG. 1 illustrates the protective cover 6 of the exemplary embodiment having two air flow openings 8 for feeding cooling air to the brake disk 4. In the first operating position, shown in FIG. 1, of the braking apparatus 1, the air flow openings 8 are opened by an airflow control mechanism 9 that operates to open and close the air flow opening 8. A portion of the airflow control mechanism 9 is visible and can be seen through the air flow opening 8 in FIG. 1, as the airflow control mechanism 9 is arranged on an inner side of the protective cover 6 facing the brake disk 4.

Figure 2:
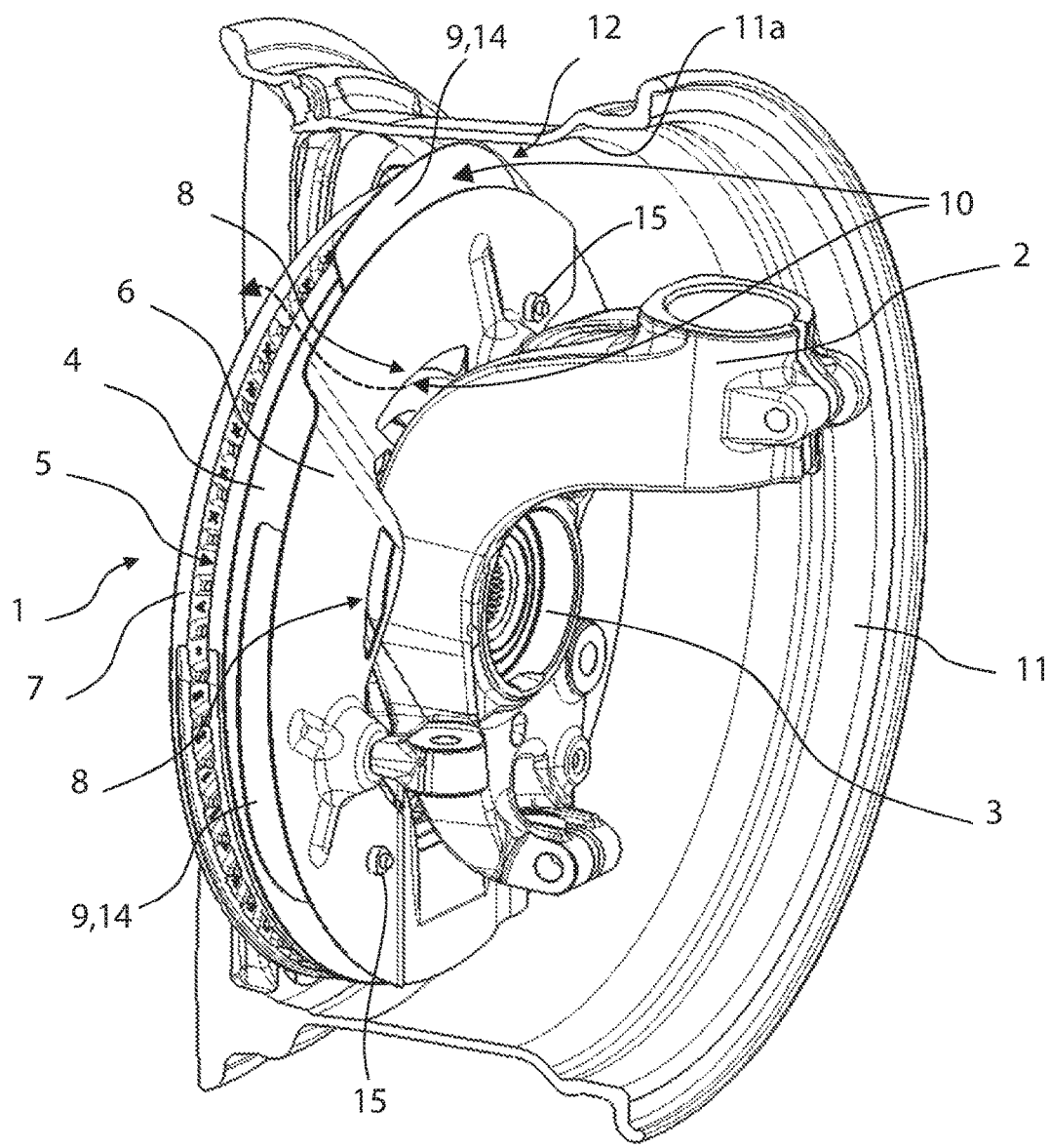
FIG. 2 is a perspective view of the braking apparatus of FIG. 1 in a second operating position.

FIG. 1 shows two air flow arrows 10 indicating air flow in the braking apparatus 1 during the operation of the vehicle. Because the air flow openings 8 of the protective cover 6 of the braking apparatus 1 are closed in the first operating position, see FIG. 1, air is prevented from flowing through the opening 8, in the direction of the lower flow arrow 10; instead, the air in the braking apparatus 1 flows over the radial end side 7 of the brake disc 4 and through a gap 12 formed between the radial end side 7 of the brake disk 4 and an inner side or surface 11*a* of a wheel rim 11, attached to the wheel hub 3, in the direction of the upper flow arrow 10. In the first operating position of the braking apparatus 1, substantially no cooling air feeds the inlet openings of the flow ducts 5 of the brake disk 4 arranged on the hub side because the opening 8 is closed. In the first operating position, shown in FIG. 1, the brake disk 4 of the braking apparatus 1 requires reduced cooling or ventilation because the braking apparatus 1, including the brake disc 4, develops only a small amount of heat. Because of reduced cooling needs or requirements, the airflow control mechanism 9 of the protective cover 6 closes the opening 8 to provide protection against contamination and spray water FIG. 2 shows a perspective view similar to FIG. 1 of the braking apparatus 1 in a second operating position. In the second operating position, the redirection mechanism 9 opens the air flow openings 8 of the protective cover 6 whereby cooling air flows through the air flow openings 8 of the protective cover 6, as shown by way of the lower of the two air flow arrows 10. The cooling air flowing through the air flow openings 8 flows to the inlet openings of the flow ducts 5 in the brake disk 4 to ventilate and cool the brake disk 4.

The airflow control mechanism 9 operates to open the air flow openings 8 of the protective cover 6 and reduce the gap 12 between the radial end side 7 of the brake disk 4 and the inner side of the wheel rim 11. As shown in FIG. 2, reducing the size or amount of the gap 12 reduces the resultant air flow through the gap 12. Increased air pressure prevailing on the vehicle inner side on the side of the brake disk 4 causes a higher air throughput or flow through the air flow openings 8 of the protective cover 6. Achieving a more pronounced incident flow of cooling air onto the brake disk 4 makes possible more efficient cooling of the brake disk 4.

Figure 3:
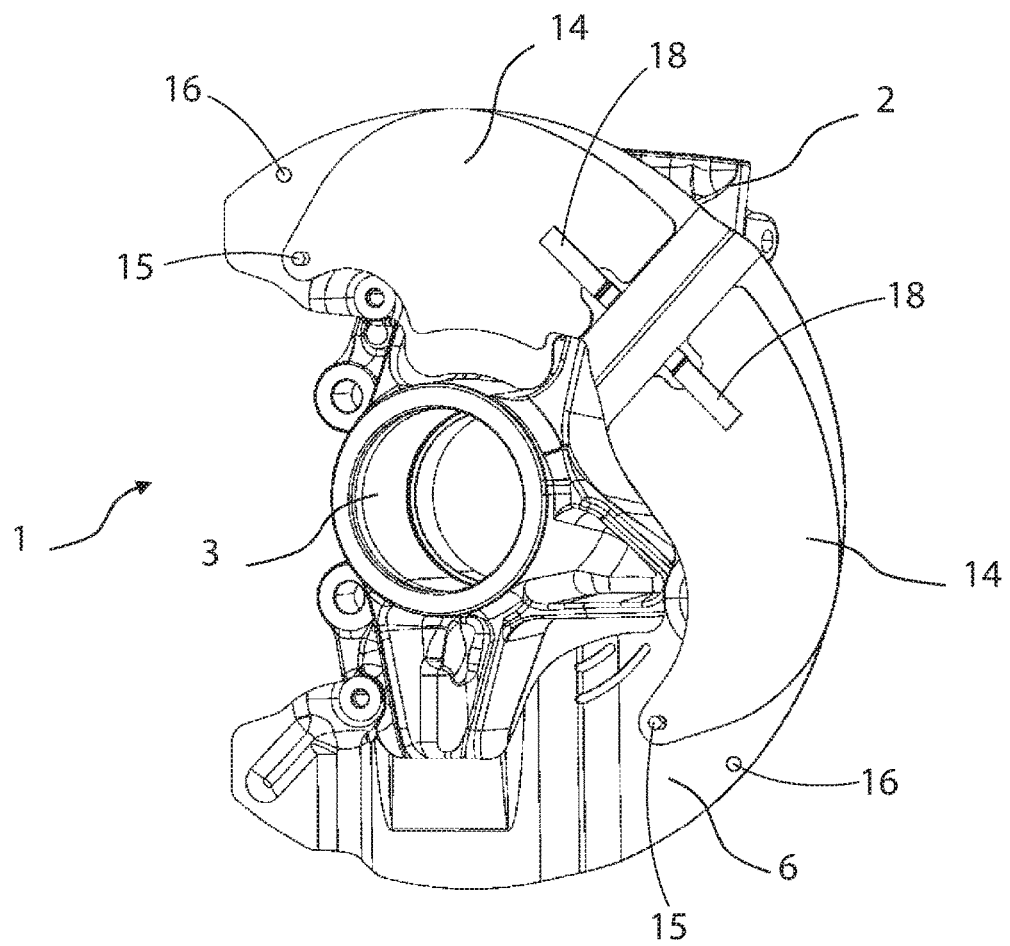
FIG. 3 is a side view of the inside of the braking apparatus of FIG. 1 in the first operating position.

FIG. 3 shows a side view of the inner side, the side facing the brake disk 4, of the protective cover 6 of the braking apparatus 1 of FIG. 1, in the first operating position. In the exemplary embodiment, the airflow control mechanism 9 operates to both open/close the air flow openings 8, see FIG. 4, and to reduce/increase the gap 12 at the radial end side 7 of the brake disk, see FIGS. 1, 2. As illustrated in the exemplary embodiment, the airflow control mechanism 9 is coupled to the braking apparatus 1 such that opening the air flow openings 8 brings about the reduction of the gap 12 at the same time. Conversely, closing the air flow opening 8 brings about the increase of the gap 12 at the same time. In the exemplary embodiment of the braking apparatus 1 shown, the airflow control mechanism 9 includes a closure plate 14 mounted on the protective cover 6. The closure plate 14 movable in a radial direction of the brake disk 4, outwardly towards the radial end side 7 of the brake disk 4. The movement of the closure plate 14 in an outward or radial direction of the brake disk 4 makes possible a braking apparatus 1 of particularly compact overall size since no parts are moved out of the plane of the protective cover 6 for opening the air flow openings 8 that then project from the protective cover 6. Overall, the exemplary embodiment of the braking apparatus 1 has two closure plates 14, one closure plate 14 assigned to each air flow opening 8 of the protective cover 6.

Figure 4:
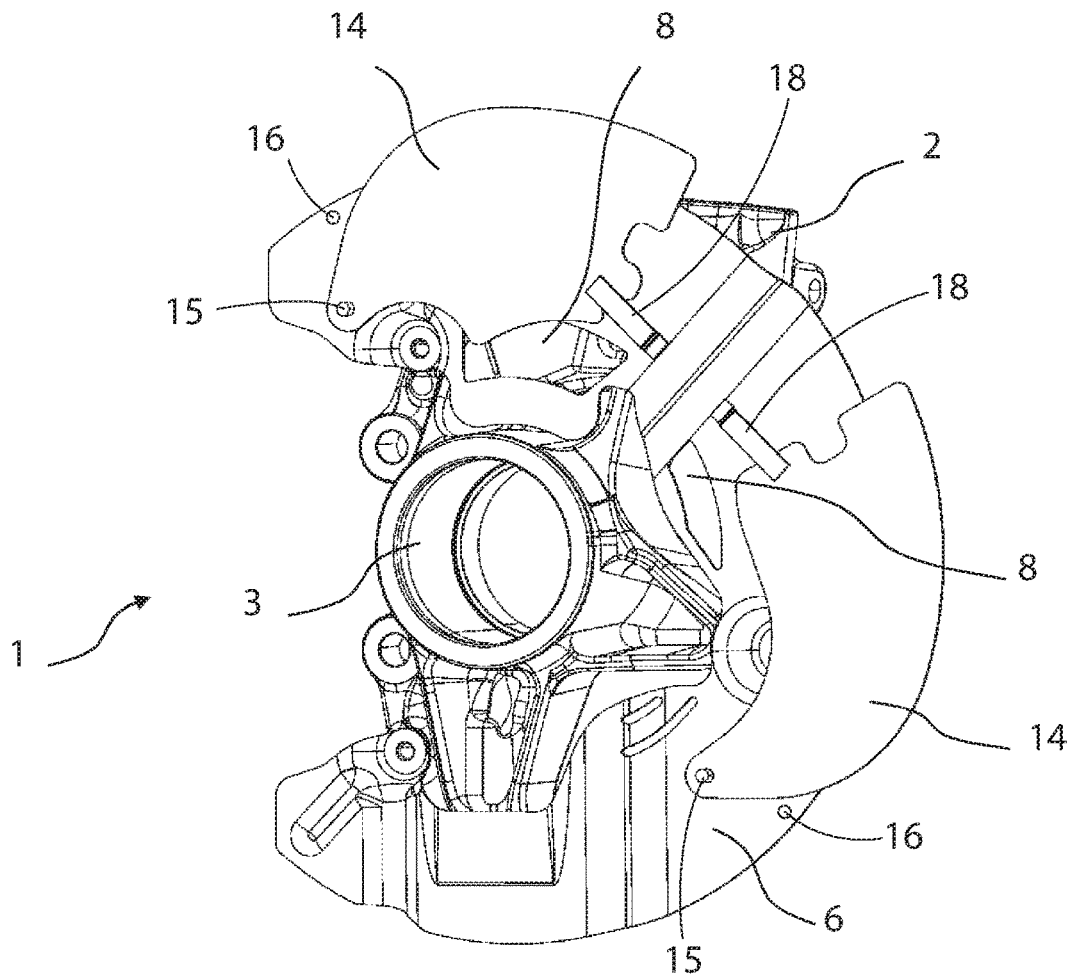
FIG. 4 is a side view of the inside of the braking apparatus of FIG. 3 in the second operating position.

FIG. 4 is the same side view of the inside of the braking apparatus 1, similar to FIG. 3, in the second operating position. In the second operation position, the closure plates 14 move or pivot about pivot points 15 opening the air flow openings 8 of the protective cover 6, FIG. 4 shows the air flow openings 8 uncovered or open. In the exemplary embodiment the closure plate 14 pivots on the protective cover 6 at pivot point 15 in the radial direction of the brake disk 4 and move radially outward resulting in a radially outer part 14*a* of the closure plate 14 extending past the outer periphery or edge of the protective cover 6 and into the gap 12. At the same time as the air flow openings 8 are opened the gap 12 is reduced.

To avoid contact of the closure plate 14 with the wheel rim 11 in the second operating position of the braking apparatus 1, the maximum movement of the closure plate 14 in the radial direction is limited by way of a stop 16, which can be attached to the protective cover 6.

The closure plates 14 of the exemplary embodiment of the braking apparatus 1 are coupled or connected to the protective cover 6 by a temperature-sensitive bimetallic actuator or a temperature-sensitive shape memory actuator, show schematically at 18. In one embodiment, expansion of actuator 18 moves the closure plates 14 outward in the radial direction of the brake disk 4. The actuators 18 may change their shape in a temperature dependent manner depending on a temperature acting on them. The actuators 18 producing energy to move or drive the closure plates 14 between the first and second operating position. As illustrated the actuators 18 are on the inside, the side of the protective cover 6 adjacent the brake disk 4. Placing the actuators 18 on the inside and coupling the closure plate 14 to the protective cover 6 in this manner, allows heat generated by the brake disk 4 during braking to act on and activate the actuators 18. Consequently, the closure plates 14 automatically open or close the air flow openings 8 in the protective cover 6 above a defined temperature of the brake disk 4.

The above-described braking apparatus 1 includes identically acting further embodiments, for example, more or fewer air flow openings 8 can be provided in a protective cover 6. The air flow openings 8 can be opened or closed by one or more closure plates 14, for example, one closure plate 14 for each air flow opening 8. Moreover, the airflow control mechanism 9 operating to open/close the air flow opening 8 and reduce/increase the gap 12 between the radial end side 7 of the brake disk 4 and the inner side of the wheel rim 11 may include two individual components; one plate 14 to close the opening 8 and an additional plate 14 to reduce/increase the gap 12.

As disclosed, the braking apparatus 1 is used with a vehicle, in particular, a motor vehicle having a wheel suspension part or wheel support 2 that can be attached to a body of the vehicle. For example, a wheel support 2, with a wheel hub 3 is attached to the wheel suspension part. An air-cooled brake disk 4, for example, an internally ventilated brake disk, is attached to the wheel hub 3 such that it rotates relative to the wheel suspension part 2. The braking apparatus 1 includes a protective cover 6 that at least partially covers the brake disk laterally, for example, a protective plate. The protective cover 6 arranged on the side of the brake disk 4 and fastened in a stationary manner to the wheel suspension part 2. The protective cover 6 can, for example, be fastened directly to the wheel suspension part 2 or another component of the vehicle, stationary with regard to the wheel suspension part 2. The dimension or size of the protective cover 6 is such that the protective cover 6 poses no difficulties during wheel mounting. For example, the radial extent of the protective cover 6 preferably corresponds to the radial extent of the brake disk 4, to cover the brake disk 4 laterally in a satisfactory manner and therefore protect it, for example, from spray water and gross contamination.

To feed cooling air to the brake disk 4 for cooling during operation, the protective cover 6 includes an air flow opening 8. The air flow opening 8 arranged, for example, in the vicinity of the wheel hub 3, to feed cooling air to inlet openings, arranged in the vicinity of the wheel hub 3, of the flow ducts of a conventional, internally ventilated brake disk 4. The brake assembly includes an airflow control mechanism that opens/closes the air flow opening 8 in the braking apparatus 1 as disclosed.

Ventilation of the brake disk 4 and correspondingly brake disk 4 cooling takes place when cooling of the brake disk 4 is required. In the exemplary embodiment, the air flow opening 8 in the protective cover 6 remains closed if no braking operation takes place and the temperature of the brake disk 4 lies below a predetermined or critical temperature, above which the material of the brake disk might be damaged, or the braking performance of the braking apparatus might be impaired, for example, brake fade. If, however, cooling of the brake disk 4 becomes necessary because of, for example, heavy loading and heat development, the airflow control mechanism 9 opens the air flow opening 8 of the protective cover 6, wherein air circulates through the air flow opening 8 of the protective cover 6 toward the brake disk 4 and, as a consequence, ventilation of the brake disk 4 caused by air circulation through the flow ducts in the brake disk 4 can take place.

The opening/closing mechanism also reduces and increases a gap 12 between a radial end side 7 of the brake disk 4 and an inner side of a wheel rim 11 of a vehicle wheel fastened to the wheel hub 3. Air flow usually taking place through the gap 12 from the wheel inner side to the wheel outer side or vice versa is not substantially involved in the ventilation of the brake disk 4 and can redirected when the gap 12 is closed or reduced; for example, in the case of an increased cooling requirement. The air flow through the gap 12 between the radial end side 7 of the brake disk 4 and the inner side of the wheel rim 11 is substantially suppressed, causing an increased air pressure on the side of the brake disk 4. The increased air pressure leads to an increased air throughput through the open air flow opening 8 in the protective cover 6 and therefore an increased incident flow of cooling air onto the brake disk 4, brings about more efficient cooling of the brake disk 4.

The exemplary embodiment operating to both reduce/increase the gap 12 and open/close the air flow opening 8 at the same time provides first and second operating positions wherein reducing of the gap 12 corresponds to opening the air flow opening 8 and increasing the gap 12 corresponds to closure of the air flow opening 8. In this way, optimum, efficient ventilation or cooling of the brake disk 4 occurs where the air flow opening 8 in the protective cover 6 is opened. With a closed air flow opening 8, the air can flow through the gap 12 between the radial end side 7 of the brake disk 4 and the inner side of the wheel rim 11 in a virtually unimpeded manner.

The opening and closing mechanism that opens/closes the air flow opening 8 and reduces/increases the gap 12 includes a closure plate 14, for example, a metal closure plate. The closure plate 14 movably mounted on the protective cover 6 wherein it moves in the radial direction of the brake disk 4, providing a compact construction of the braking apparatus 1. To close the air flow opening 8 in the protective cover 6, the closure plate 14 covers the air flow opening 8 completely. The closure plate 14 preferably arranged in a closure position such that it does not protrude beyond the radial end side 7 of the brake disk 4. In an exemplary embodiment, when the air flow opening 8 in the protective cover 6 is opened by moving the closure plate 14 in the radial direction of the brake disk 4 toward the outside, a radially outer part 14*a* of the closure plate 14 is, at the same time, pushed beyond the radial end side 7 of the brake disk 4 into the gap 12 between the radial end side 7 of the brake disk 4 and the inner side of the wheel rim 11, and in this way reduces the size, span, or distance between the inner side or inner surface 11*a* of the wheel rim 11 and the radial end side 7 of the brake disk 4, of the gap 12. If, in contrast, the closure plate 14 closes the air flow opening 8 in the protective cover 6 by moving the closure plate 14 inward in the radial direction of the brake disk 4, the radially outer part 14*a* of the closure plate 14 that previously protruded or extended into the gap 12 is, at the same time, also pulled back or drawn radially inside toward wheel hub 3, such that the gap 12 is once again increased.

The closure plate 14 may be displaced linearly along the protective cover 6 in the radial direction of the brake disk 4. As shown in one embodiment, the closure plate 14 may be pivotally attached to and pivoted on the protective cover 6 whereby it moves in and out in the radial direction of the brake disk 4.

A further embodiment includes a temperature-sensitive bimetallic actuator or a temperature-sensitive shape memory actuator 18, for example, a shape memory alloy, coupling the closure plate 14 to the protective cover 6. The actuator 18 causes movement of the closure plate 14 and is arranged in such a way that heat generated by the brake disk during braking acts on the actuator 18. The air flow opening 8 in the protective cover 6 opens or closes automatically in a manner dependent on the temperature of the brake disk 4, depending on the cooling requirement(s) of the brake disk 4. The preceding dispenses with complicated actuating electronics and drive mechanisms for controlling the movement of the closure plate 6. A temperature sensor monitoring brake disc temperature may be provided, wherein actuating electronics might then control the movement of the closure plate 14 in a manner dependent on the temperature determined by the sensor, to open or to close the air flow opening 8 in the protective cover 6 and/or to reduce or to increase the gap 12 between the radial end side 7 of the brake disk 4 and the inner side 11*a* of the wheel rim 11.

Movement of the closure plate 14 is limited by a stop 16 to avoid contact of the closure plate 14, extending or pushed into the gap 12 between the radial end side 7 of the brake disk 4 and the inner side 11*a* of the wheel rim 11, with the wheel rim 11 when the closure plate 14 moves in the radial direction of the brake disk 4 during opening of the air flow opening 8 of the protective cover 6

The closure plate 14 is attached to the protective cover 6 on an inner side of the protective cover 6 facing the brake disk 4. As a result, the closure plate 14 and its movement mechanism are protected against spray water and gross contamination.

The protective cover 6 may have a substantially of disk-shaped configuration and sized to cover the brake disk 4 laterally over the full surface area, to protect the brake disk 4 against spray water and gross contamination. The protective cover 6 arranged on that side of the brake disk 4 facing the inside of the vehicle. However, the protective cover 6 may be arranged on that side of the brake disk 4 facing the outside of the vehicle. Also, two protective covers 6 may be provided, one on that side of the brake disk 4 facing the inside of the vehicle and one on that side of the brake disk 4 facing the outside of the vehicle.

The exemplary embodiment provides a braking apparatus 1 for a vehicle, in particular, a motor vehicle, having a brake disk 4 protected from spray water and gross contamination and providing cooling of the brake disk, in the case of brake actuation. Moreover, the braking apparatus 1 is of compact overall size and provides efficient cooling of the brake disk 4.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A braking apparatus for a vehicle comprising:
   a wheel suspension attached to the vehicle, a wheel hub attached to the wheel suspension, and a brake disk rotatably attached to the wheel suspension;
   an air flow gap between a radial end side of the brake disk and an inner side of a wheel rim of a vehicle wheel;
   a protective cover partially covering the brake disk and fastened to the wheel suspension, the protective cover has an air flow opening feeding cooling air to the brake disk, the air flow opening spaced from the air flow gap; and
   an airflow control mechanism opening and closing the air flow opening and, reducing and increasing a size of the air flow gap.

2. The braking apparatus of claim 1 wherein the airflow control mechanism opens the air flow opening and reduces the size of the air flow gap when the airflow control mechanism opens the air flow opening.

3. The braking apparatus of claim 1 wherein the airflow control mechanism closes the air flow opening and opens the size of the air flow gap when the airflow control mechanism closes the air flow opening.

4. The braking apparatus of claim 1 wherein the airflow control mechanism both opens the air flow opening and reduces the air flow gap such that the airflow control mechanism opens the air flow opening and closes the air flow gap.

5. The braking apparatus of claim 1 wherein the airflow control mechanism is mounted on the protective cover such that it moves in a radial direction of the brake disk.

6. The braking apparatus of claim 1 wherein the airflow control mechanism includes a closure plate movable with respect to the protective cover in a radial direction of the brake disk.

7. The braking apparatus of claim 6 wherein the closure plate is pivotally mounted on the protective cover.

8. The braking apparatus of claim 6 including a temperature-sensitive bimetallic actuator connected to the closure plate wherein said actuator moves said closure plate.

9. The braking apparatus of claim 6 including a temperature-sensitive shape memory actuator connected to the closure plate wherein said actuator moves said closure plate.

10. The braking apparatus of claim 6 wherein a stop limits movement of said closure plate.

11. The braking apparatus of claim 6 wherein the closure plate is attached to said protective cover on an inner side of said protective cover, said inner side of said protective cover facing said brake disk.

12. A braking apparatus comprising:
    a wheel hub;
    a brake disk connected to the wheel hub;
    a protective cover extending between the wheel hub and a radial end of the brake disk, the protective cover having an opening, the opening closer to the wheel hub than said radial end of said brake disk;
    a closure plate, with a peripheral edge, movable between a first position and a second position;
    said first position includes said closure plate covering said opening and said peripheral edge located radially inward of and not past said radial end of said brake disk; and
    said second position includes said closure plate spaced from said opening and said peripheral edge spaced radially outward of and past said radial end of said brake disk.

13. The braking apparatus of claim 12 wherein the closure plate is movably connected to and moves in a radial direction of the brake disk.

14. The braking apparatus of claim 12 including an actuator connected to said closure plate and operative to move said closure plate between said first and second positions.

15. The braking apparatus of claim 12 wherein the closure plate is pivotally mounted on the protective cover.

16. The braking apparatus of claim 12 including a temperature-sensitive bimetallic actuator connected to the closure plate wherein said actuator moves said closure plate.

17. The braking apparatus of claim 12 including a temperature-sensitive shape memory actuator connected to the closure plate wherein said actuator moves said closure plate.

18. The braking apparatus of claim 12 including a stop, said stop contacting said closure plate to limit movement of said closure plate.

* * * * *